Jan. 10, 1967     F. V. VIDJAK ETAL     3,296,655
APPARATUS FOR MOLDING COMMINUTED MATERIAL
Filed Aug. 6, 1963     4 Sheets-Sheet 1
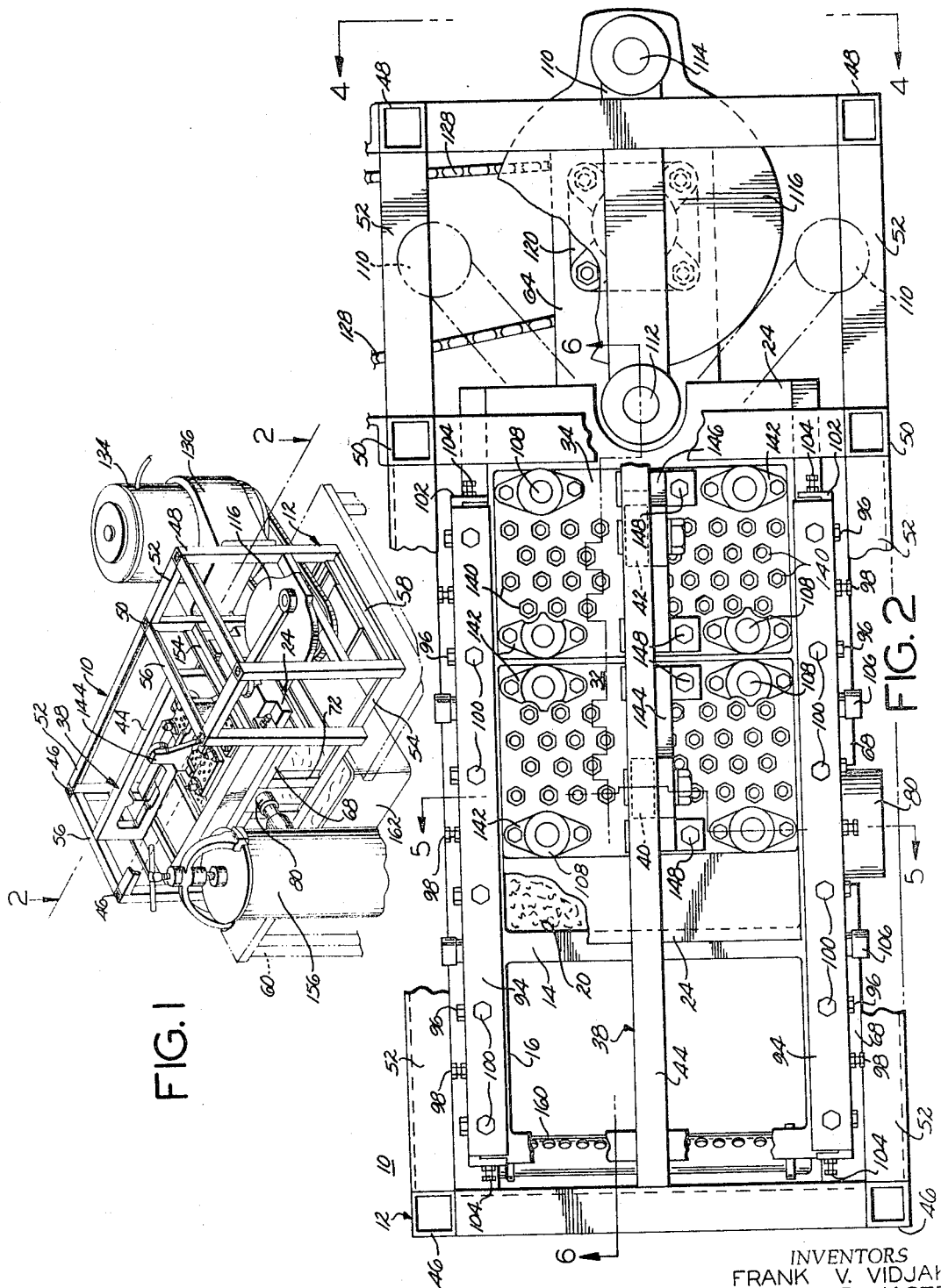
INVENTORS
FRANK V. VIDJAK
PETER W. BYNAGTE
BY FULWIDER, PATTON,
RIEBER, LEE & UTECHT
ATTORNEYS

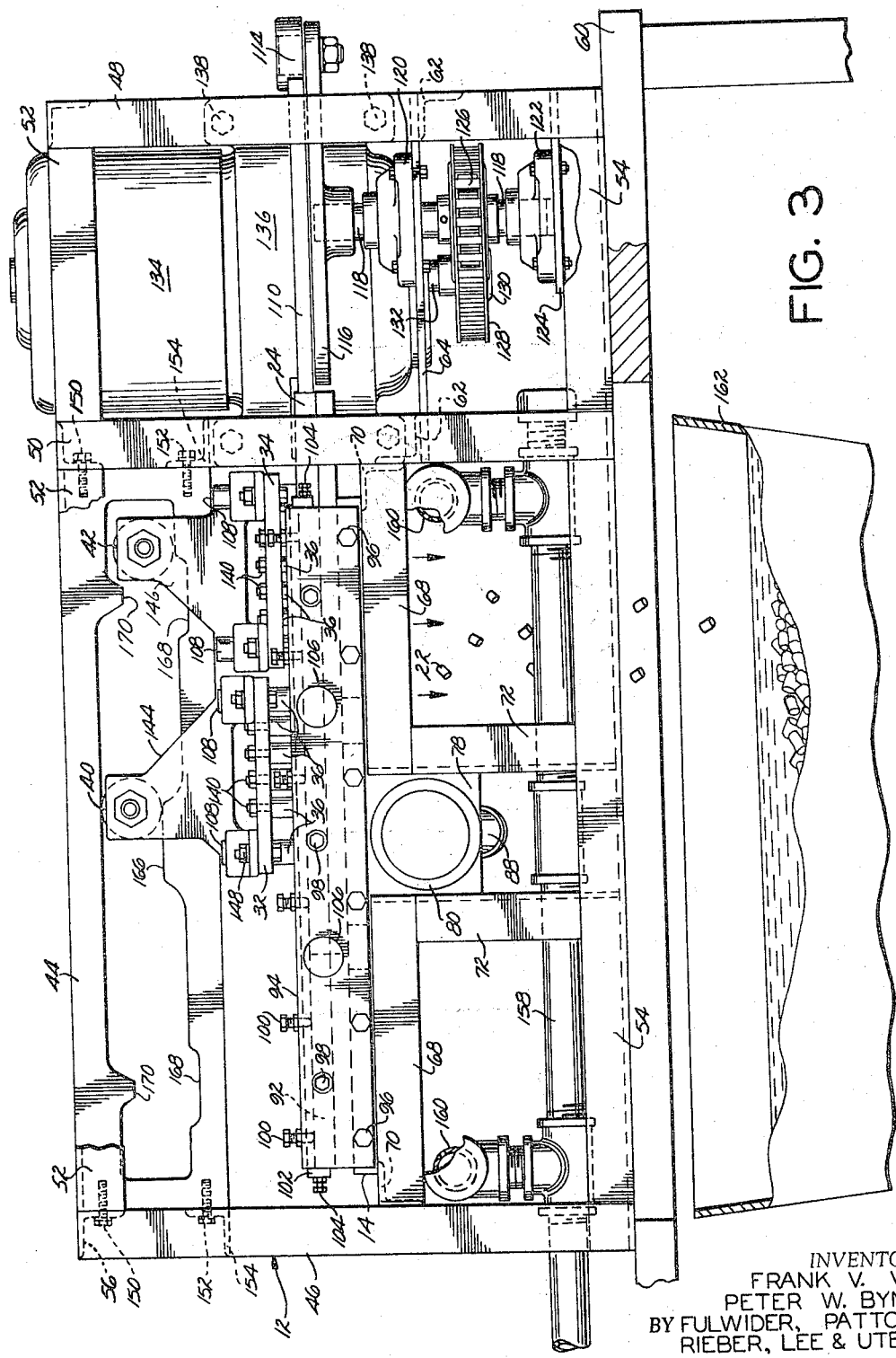

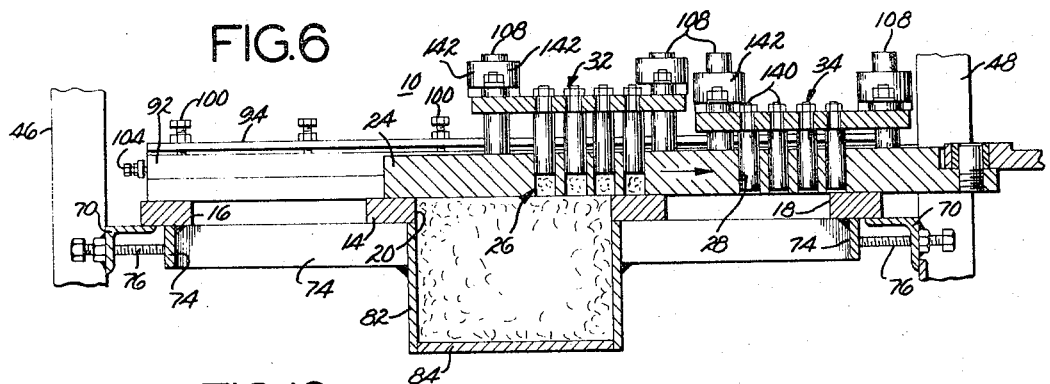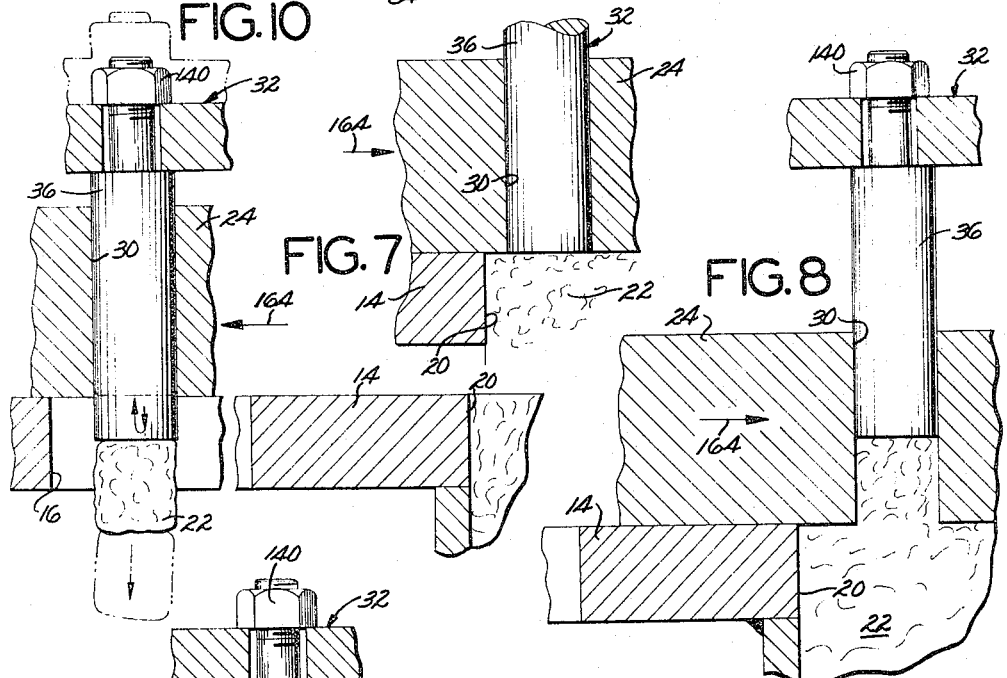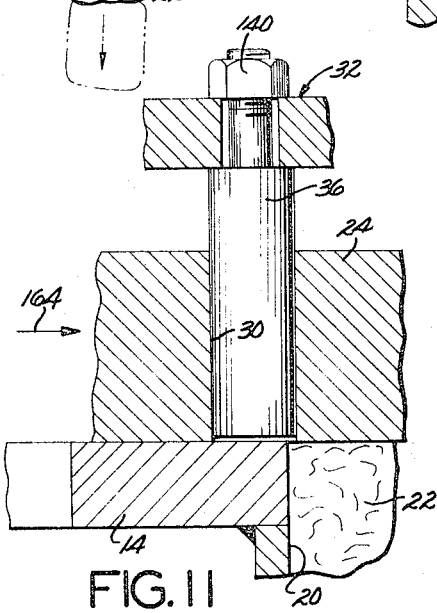

United States Patent Office 3,296,655
Patented Jan. 10, 1967

3,296,655
APPARATUS FOR MOLDING COMMINUTED
MATERIAL
Frank V. Vidjak, San Pedro, and Peter W. Bynagte, Wilmington, Calif., assignors to Star-Kist Foods, Inc., Terminal Island, Calif., a corporation of California
Filed Aug. 6, 1963, Ser. No. 300,210
8 Claims. (Cl. 17—32)

The present invention relates to an apparatus for molding comminuted material, and more particularly to an apparatus for manufacturing substantially uniformly sized chunks or balls of comminuted material.

A number of machines are commercially available to manufacture ground meatballs or chunks or similar comminuted material, but these machines are either inordinately complicated and costly, severely limited in production speed and capacity, or ineffective to handle comminuted materials including fatty, greasy substances. In particular, such machines have been found to be incapable of rapidly forming balls or chunks at a rapid rate without having the comminuted material undesirably stick and adhere to the mold and discharge components of the machines. This problem quickly made itself apparent when attempts were made to manufacture meatballs out of ground chicken necks and the like in commercial quantities for sale as a pet food.

Accordingly, it is an object of the present invention to provide a molding apparatus for comminuted material which is operative to automatically and rapidly form chunks or balls of ground meat of predetermined size.

Another object of the invention is to provide an apparatus of the aforementioned character which includes means defining a plurality of material-receiving openings and pistons operative in such openings to discharge the material from the openings, and wherein the piston faces in engagement with the material are driven exteriorily of the cylinders, with the comminuted material thereon, at a sufficiently rapid rate to develop a momentum in the comminuted material. The apparatus is operative to rapidly reverse the direction of movement of the pistons so as to effect separation of the comminuted material from the piston faces, it being noted that the location of the piston faces exteriorily of the cylinders reduces the area of adhesion of the comminuted material to the components of the apparatus so that the separation is much more easily accomplished.

A further object of the invention is the provision of an apparatus of the aforementioned character including cylinders and pistons operative therein to force comminuted material therefrom, and further incorporating means for directing a heated fluid against the pistons, particularly when the piston faces in contact with the comminuted material are located exteriorily of their associated cylinders. The heated fluid is effective to raise the temperature of the pistons and the comminuted material thereon sufficiently to partially melt the fatty or greasy components of the comminuted material to further reduce the tendency for adhesion between the comminuted material and the piston faces.

Another object of the invention is to provide an apparatus of the aforementioned character which includes means defining an inlet opening into which comminuted material is introduced under pressure, and wherein the cylinders or material-receiving openings form part of the plate which is reciprocable into and out of overlying relationship with such inlet opening. Moreover, the pistons operative in the cylinders are actuated so as to undergo an intake stroke simultaneously with registry of the cylinders with the inlet opening whereby the pistons are effective to draw the comminuted material into the cylinders. This arrangement obviates the difficulty of venting the cylinders to facilitate entry of the comminuted material therein.

A further object of the invention is the provision of an apparatus of the aforementioned character in which the inlet opening for receiving the comminuted material under pressure is located between a pair of spaced-apart discharge openings, and in which two sets of cylinders are provided in a plate which is longitudinally reciprocable so as to alternately place the cylinders in registry with the inlet opening and thence in registry with one of the discharge openings. Thus, the cylinder plate received comminuted material in one set of cylinders when the cylinder plate is driven in one direction, and receives comminuted material in the other set of cylinders when the cylinder plate is moved in the opposite direction. Two sets of pistons are associated with the two sets of cylinders, and the two sets of pistons are alternately reciprocated within the two sets of cylinders so as to effect a discharge of comminuted material on both the forward and return strokes of the cylinder plate, resulting in a high production operation.

A further object of the invention is the provision of an apparatus of the aforementioned character in which the two sets of pistons are reciprocated within their associated cylinders by a pair of cam rollers carried by the piston sets, respectively, and engageable with a relatively fixed or stationary cam track having abrupt cam rises for abruptly changing the direction of stroke of the pistons immediately subsequent to location of the lower piston faces outwardly of their associated cylinders, whereby the developed momentum in the chunks of comminuted material is utilized to effect separation of the comminuted material from such piston faces.

A further object of the invention is the provision of an apparatus of the aforementioned character in which the cylinder plate includes dowel pins or guides upon which the pair of piston mounts incorporating the two sets of pistons are reciprocable whereby the pistons are reciprocable within their cylinders while simultaneously undergoing reciprocation into and out of registry with the inlet and discharge openings by reason of the reciprocation of the cylinder plate.

A further object of the invention is to provide an apparatus for facilitating discharge from a cylinder of comminuted material in contact with the piston face of a piston located in the cylinder, including means for driving the piston to locate the piston face thereof in contact with the comminuted material outwardly of the cylinder to reduce the area for adherence of the comminuted material and to develop a momentum in the material, and thereafter rapidly reversing the direction of travel of the piston to utilize the momentum of the material to effect separation thereof from the piston face. Such apparatus preferably also includes means for simultaneously raising the temperature of the material and the piston face to further facilitate the separation of the comminuted material from the piston face.

Other objects and features of the invention will become apparent from consideration of the following description taken in connection with the accompanying drawings, in which:

FIG. 1 is a perspective view of a molding apparatus for comminuted material, according to the present invention, illustrated in associated with a suitable means for feeding comminuted material under pressure to the apparatus;

FIG. 2 is a plan view, taken along the line 2—2 of FIG. 1;

FIG. 3 is a front elevational view of the apparatus of FIG. 2;

FIG. 6 is a cross-sectional view, on a reduced scale, taken along the line 6—6 of FIG. 2; and FIGS. 7 through 11 are enlarged detail views illustrating the sequential positions of a typical piston, in relation to its adjacent components, commencing with the intake of comminuted material in its associated cylinder to the discharge thereof from such cylinder.

Figure 4:
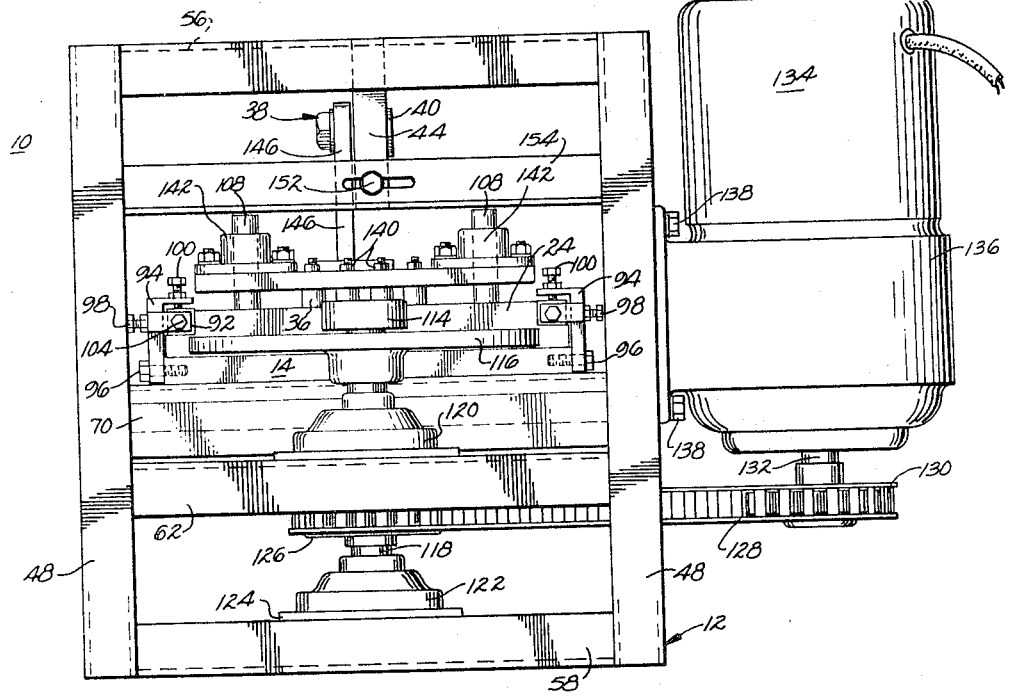
FIG. 4 is an end elevational view taken along the line 4—4 of FIG. 2.

Referring now to the drawings, and particularly to FIGS. 1 through 6 thereof, there is illustrated a molding apparatus for comminuted material, and particularly a molding apparatus 10 which is effective to rapidly produce relatively large quantities of balls or chunks of comminuted material constituted of ground frozen chicken necks for incorporation in pet food. Of course, the apparatus 10 is also adapted for processing ground hamburger and like comminuted materials and the pet food application is merely exemplary.

The apparatus 10 comprises, generally, a rectangular, box-like frame 12 constituted of a plurality of interconnecting angles and tubing; a rectangular, planar bottom plate 14 preferably removably mounted on the frame 12, although it may constitute a part thereof if desired, the plate 14 defining a pair of rectangular, longitudinally spaced-apart, discharge openings 16 and 18, FIG. 6, for discharging comminuted material in the form of balls or chucks, as generally indicated at 22, and an intermediate, rectangular inlet opening 20 through which incoming, unmolded comminuted material enters. An elongated, planar, and substantially rectangular top plate 24 horizontally oriented superjacent the bottom plate 14 and including a pair of longitudinally spaced-apart cylinder sets 26 and 28, FIG. 6, each of which is constituted by a plurality of material-receiving openings or cylinders 30 formed by boring vertical holes in the top plate 24, the top plate 24 being reciprocable to bring the cylinder sets 26 and 28 into alternate registry with the inlet opening 20 and the discharge openings 16 and 18, a pair of planar, rectangular, and horizontally oriented piston plates or mounts 32 and 34, FIG. 2, located superjacent the top plate 24 and each mounting a plurality of pistons 36, FIG. 3, which are slidably accommodated in the complemental cylinders 30, the piston mount 32 being associated with the cylinder set 26 and the piston mount 34 being associated with the cylinder set 28, the piston mounts 32 and 34 also being mounted to the top plate 24 so as to be vertically reciprocable with respect thereto, as will be seen, whereby the pistons 36 reciprocate vertically within the cylinders 30; and a cam means 38 which includes a pair of cam rollers 40 and 42 affixed to the piston mounts 32 and 34, respectively, and which cooperates with a cam track 44 secured to the frame 12 to raise and lower the piston mounts 32 and 34 to effect the desired reciprocation of the pistons 36 in the cylinders 30. The particular construction of the components generally categorized in the preceding paragraph will next be described.

Frame

The frame 12 is preferably made primarily of readily available steel angles, square tubing and the like, and comprises a pair of vertically oriented end posts 46, a pair of vertically oriented end posts 48, and a pair of vertically oriented intermediate posts 50, the aforementioned posts being welded at their upper extremities to longitudinally oriented top angles 52 and at their lower extremities to longitudinally oriented bottom angles 54. Similarly, transverse upper and lower angles 56 and 58, respectively, are welded to the upper and lower extremities of the posts 46, 48 and 50 to form the rectangular, box-like, and open structure of the frame 12 for mounting the various components of the apparatus 10. The all welded construction of the frame 12 provides structural rigidity as well as easy access to such apparatus components.

The frame 12 is rigidly secured in any suitable fashion to a support table 60, as seen in FIG. 3, and includes additional frame structure, in the form of a pair of transversely and horizontally oriented crank support angles 62, for rigidly mounting a crank plate 64. The frame 12 also includes a pair of transverse cam track support angles 66 which are welded at their opposite extremities to the adjacent posts to support the cam track 44, it being noted that the upper end angles 56 also support the cam track 44.

Frame 12 further includes a rectangular support framework constituting a support bed for the bottom plate 14, this framework including a pair of longitudinal bottom plate angles 68 and a pair of transverse bottom plate angles 70 whose extremities, respectively, are welded to the adjacent posts 46 and 50. However, the front angle 68 is discontinuous to accommodate the particular configuration of the bottom plate 14 and for this purpose is welded to the upper extremities of a pair of vertical angles 72, whose lower extremities are welded to the front bottom angle 54 to define an opening for certain inlet conduit for the incoming comminuted material, as will be seen.

Bottom plate

Figure 5:
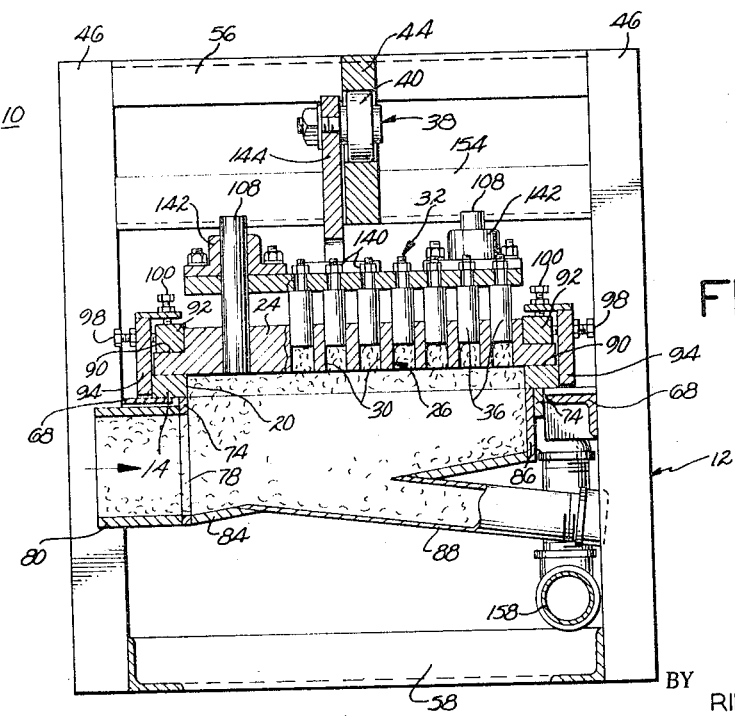
FIG. 5 is a cross-sectional view taken along the line 5—5 of FIG. 2.

The rectangular configuration and size of the bottom plate 14 is such that it substantially exactly conforms to the rectangular opening defined therefor by the longitudinal angles 68 and the transverse angles 70, as best viewed in FIGS. 5 and 6. The bottom plate 14 includes a vertically oriented peripheral skirt 74 which depends from the horizontal main portion of the plate, the skirt 74 being inwardly recessed to define a peripheral lip which slidably or movably rests upon the angles 68 and 70. With this arrangement, the bottom plate 14 and those components supported thereby can be longitudinally adjusted in position by a pair of machine screws 76, FIG. 6, threadably disposed through machine screw nuts welded to the angles 70 and bearing against the skirt 74. Such adjustment is desirable for precise location of the discharge openings 16 and 18 and the inlet opening 20 relative to the cylinder sets 26 and 28, as will become apparent.

The bottom plate 14 also includes an integral, depending feed hopper defined by a front plate 78, FIG. 3, which fits against the vertical angles 72 and includes a horizontally oriented inlet conduit 80. The sides of the feed hopper are defined by a pair of longitudinally spaced side walls 82, FIG. 6, welded at their upper edges to the horizontally oriented main portion of the plate 14, a rearwardly and upwardly sloping bottom wall 84 is welded to the lower margins of the side walls 82, and a rear wall 86 forms the rear of the hopper so that the hopper is closed off except for the inlet opening 20, which forms the exit opening therefrom. In addition, as best viewed in FIG. 5, a normally capped clean-out pipe 88 welded to the bottom wall 84 is in fluid communication with the interior of the hopper to permit cleaning and draining thereof when desired.

The bottom plate 14 also includes a plastic gasket (not shown) suitably secured to the upper surface thereof to provide better sliding contact with the top plate 24, and without the production of the dark metallic residue which otherwise normally occurs in the event of metal-to-metal contact.

Top plate

The cylinder or top plate 24, which is longitudinally reciprocable upon the bottom plate 14, is stepped at its longitudinal edge margins to provide a pair of ledges 90 for supporting a pair of elongated, coextensive slide bars 92. The top plate 24 is thus slidably reciprocable in a longitudinal direction between the adjoining surfaces of the bottom plate 14 and the slide bars 92, which are utilized to adjust the transverse and vertical positions of the top plate 24.

A pair of elongated slide frames 94 are arranged coextensive with the slide bars 92, and include vertical portions rigidly secured at their lower extremities to the bottom plate 14 by a plurality of bolts 96, FIG. 4. The upper extremities thereof threadably mount a plurality of adjusting screws 98 whose inner ends bear against the outer vertical faces of the slide bars 92, the screws 98 being operative to move the bars 92 inwardly or outwardly to adjust the inward or outward position or tolerance of the top plate 24 relative to the bottom plate 14.

The slide frames 94 also include an integral upper flange or horizontal portion threadably mounting a plurality of vertically disposed adjusting screws 100 whose inner extremities bear against the horizontal upper surfaces of the slide bars 92, the screws 100 being operative to alter the vertical positions of the slide bars 92 to adjust the vertical position or tolerance of the top plate 24 relative to the bottom plate 14.

As best viewed in FIGS. 2 and 3, the slide frames 94 also include integral end flanges or tabs 102 which rotatably mount horizontally oriented adjusting screws 104 whose inner extremities bear against the ends of the slide bars 92 to constrain the slide bars 92 against longitudinal movement relative to the slide frames 94. The slide frames 94 also serve as mounts for a pair of lubrication fittings 106 which meter quantities of lubricating material into grooves (not shown) provided in the inner and lower faces of the slide bars 92 in slidable engagement with the top plate 24.

Top plate 24, which includes the cylinder sets 26 and 28, FIG. 6, also carries the piston mounts 32 and 34 for vertical reciprocation and for this purpose includes openings into which eight vertically oriented dowels or guide pins 108 are press-fitted, as best illustrated in FIGS. 2 and 5, the pins 108 being slidable through the corners of the rectangular piston mounts 32 and 34, as will be seen.

The top plate 24 is longitudinally reciprocated by a crank arm 110, FIG. 3, pivotally mounted at one extremity to the adjacent extremity of the top plate 24, and pivotally mounted at its opposite extremity by a pin 114 to a crank disk 116. The crank arm 110 converts the rotary movement of the crank disk 116 to reciprocating longitudinal movement of the top plate 24, the extreme transverse positions of the crank arm 110 being indicated in phantom outline in FIG. 2.

Referring now to FIGS. 3 and 4, the crank disk 116 is rigidly mounted to the upper extremity of a vertically oriented driven shaft 118, which is rotatably supported by a pair of vertically spaced-apart bearings 120 and 122. The bearing 120 is bolted to the crank plate 64, and the bearing 122 is bolted to a similar plate 124 welded to the frame angle 58 and other angles (not shown) which form a part of the frame 12.

A chain sprocket 126 is rigidly secured to the driven shaft 118 intermediate the bearings 120 and 122, and mounts a chain 128 which is led about a drive sprocket 130 rigidly secured to a drive shaft 132. The drive shaft 132 is rotated by an electric drive motor 134 mounted to the frame 14 by a mounting bracket 136, which is held in position by a plurality of bolts 138. The drive motor 134, together with the components intermediate the drive motor 134 and the top plate 24, constitute a drive means for longitudinally reciprocating the top plate 24.

The crank arm 110 is preferably rotated at approximately 70 revolutions per minute in order to produce a vertical reciprocation of the pistons 36 within their cylinders 30 sufficient to develop the desired inertia of the comminuted materials adjacent the piston faces, as will become more apparent hereinafter.

*Piston mounts*

The piston mounts 32 and 34 are located in juxtaposition superjacent the top plate 24, the pistons 36 thereof each being constituted by an elongated cylinder having an integral threaded upper extremity for receiving a nut 140 to secure the piston 36 in depending relationship upon the piston mount. Since the depending pistons 36 are vertically slidably disposed within their associated or complemental cylinders 30 with relatively little tolerance therebetween, approximately $\frac{1}{1000}$ of an inch on the diameter, the threaded upper extremities thereof are each of reduced diameter for relatively loose disposition within the complemental opening therefor in the piston mount. The tolerance, approximately $\frac{1}{32}$ of an inch, affords a limited freedom of movement to permit the pistons to accommodate to any slight discrepancies in the locations of the cylinders 30.

The pistons are approximately $\frac{5}{8}$ of an inch in diameter to minimize sticking problems with the comminuted material, but it will be apparent that the piston diameter may be made as required for the particular size of ball or chunk of comminuted material desired.

The eight cylindrical guide pins 108 which extend upwardly from the top plate 24 are slidably received within a corresponding number of flange bearings 142 located at the four corners of each of the piston mounts 32 and 34, and are secured in position by bolts or the like. With this arrangement, the piston mounts 32 and 34 are maintained in parallel relationship with the top plate 24 during vertical reciprocation of the associated pistons 36 within their complemental cylinders 30.

*Cam means*

As best viewed in FIG. 3, vertical reciprocation of the piston mounts 32 and 34 is provided by the cooperation between the cam rollers 40 and 42 and the cam track 44. The cam rollers 40 and 42 are rotatably carried by upstanding roller mounts 144 and 146, respectively, which are secured to their associated piston mounts by a plurality of mounting bolts 148 passing through mounting flanges integral with the lower extremities of the mounts.

The rollers 40 and 42, which are reciprocated in a longitudinal direction by virtue of their mounting upon the longitudinally reciprocable top plate 24, are also moved vertically along a cam path defined by an elongated, central opening in the cam track 44. The particular configuration of this cam path will be more particularly described in connection with a description of the operation of the apparatus 10.

The cam track 44 is preferably constituted by an elongated plate extending between the upper end angles 56 of the frame 12, and is secured thereto by a pair of mounting bolts 150 disposed through the angles 56 and into the upper portions of the ends of the track 44. The lower portions of the ends of the track 44 are secured by similar mounting bolts 152 disposed through transverse slots provided in a pair of transverse angles 154 forming a part of the frame 12. The mounting bolts 152 are threaded into the ends of the cam track 44 to secure the track 44 in position, and the slots permit pivotal movement of the cam track 44 about the mounting bolts 150 to afford adjustment in the connection of the roller mounts 144 and 146 to the associated piston mounts 32 and 34.

*Operation*

The comminuted frozen chicken neck meat or similar material is fed to the inlet conduit 80 of the apparatus 10 by a commercially available stuffer 156, FIG. 1, connected thereto which maintains the comminuted material under pressure. A continuous pump of the worm drive type could be used if desired, as well as any other suitable means for introducing the comminuted material under pressure, but the stuffer 156 is preferred. As illustrated in FIG. 1, from the inlet conduit 80 the comminuted material passes into the depending hopper portion of the bottom plate 14 for feeding through the inlet opening 20.

The apparatus 10 includes a system for directing heated fluid against the underside of the top plate 24 for raising the temperature of the lower or discharge faces of the pistons 36, and also the temperature of the comminuted material adhering thereto, such system preferably being constituted by any suitable source of steam under pressure (not shown) which is connected to a longitudinally extending steam pipe 158, FIG. 5, having a pair of transverse, longitudinally spaced-apart branches which are perforated to provide steam diffusers 160, FIG. 3. The openings or perforations in the diffusers 160 are inwardly and upwardly directed so as to direct the steam through the adjacent discharge openings 16 and 18 and against the underside of the top plate 24, as previously indicated.

The chunks or balls of comminuted material formed and discharged by the apparatus 10 fall through the discharge openings 16 and 18 into any suitable cooker, such cooker being generally indicated in FIG. 3 by a large upwardly open container 162 partially filled with heated water to cook the comminuted material and substantially prevent mutual adherence between the chunks or balls of such material after their immersion in the water.

In operation, the stuffer 156 feeds comminuted material under pressure into the hopper portion of the bottom plate 14, and the comminuted material then passes upwardly through the inlet opening 20 in the bottom plate 14 and into engagement with the underside of the top plate 24.

Referring now to FIG. 7, there is illustrated a representative piston 36 of the piston mount 32 as the same would appear as the cylinder set 26 moves from the discharge opening 18 toward the inlet opening 20. The piston 36 is over the inlet opening 20 but has not as yet begun its upward movement, all of the associated pistons 36 of the piston mount 32 being similarly located over the inlet opening 20 prior to upward movement thereof, as seen in FIG. 6. In FIG. 6, the piston mounts 32 and 34 have completed their travel in the direction of the discharge opening 18 and are about to make a return stroke in the direction of the discharge opening 16, it being noted that all of the pistons 36 of the mount 32 have completed their suction stroke.

In FIG. 8 the piston 36 has begun to rise and the partial vacuum or suction effect of the rising piston facilitates entry of the comminuted material into the cylinder 30 and adjacent of the lower face of the piston 36. In FIG. 9 the cylinder 30 is full, and the top plate 24 is commencing its return stroke or movement from the inlet opening 20 toward the discharge opening 16, it being noted that the directions of movement of the top plate 24 are indicated in each case by the arrows 164.

In FIG. 10 the piston 36 is located over the discharge opening 16 and, by virtue of the action of the cam means 38, as will subsequently be described, the piston 30 undergoes a sharp and abrupt reversal of direction so that the developed momentum of the comminuted material 22 in a downward direction is utilized to effect separation of the material from the lower face of the piston 36. Thus, the present apparatus is particularly effective to dispose the lower end or outer piston face of the piston 36 beneath or outwardly of the top plate 24 to limit the area of adherence of the comminuted material to the area presented by the piston face. Accordingly, ready separation without sticking is a feature of the present apparatus 10, and the steam directed upon the comminuted material and piston 36 by the adjacent steam diffuser 160 additionally facilitates separation of the comminuted material by raising the temperature of the material and of the piston 36 so as to melt or liquify the fatty or greasy components in the comminuted material to effect a dropping away of the material 22. The lower piston face of the piston 36 is at this time preferably approximately $\frac{5}{16}$ of an inch below the lower surface of the top plate 24.

In this regard, utilizing a crank disk 116 adapted to provide a stroke of 11 inches for the top plate 24, operating the apparatus at 70 strokes per minute, and supplying the comminuted material at a pressure of approximately 80–120 pounds per square inch, it has been found that the present apparatus 10 produces approximately 4200 meatballs per minute. At extremely high speeds of operation, substantially above that indicated, the apparatus 10 is subjected to undue structural stress, while at comparatively low speeds the comminuted material tends to stick to the lower faces of the pistons 36 since an insufficient momentum is developed in the comminuted material.

FIG. 11 illustrates the return stroke of the piston 36 toward the inlet opening 20, at which time the lower face of the piston 36 is spaced slightly above the upper surface of the bottom plate 14, substantially flush therewith, for the purpose of clearing the upper surface of the plate 14 during the horizontal movement of the top plate 14.

The vertical reciprocation of the pistons 36 is provided by a number of cam rises and cam falls formed on the interior margins of the cam track 44. Thus, as best illustrated in FIG. 3, the cam roller 40 is just completing passage over a central cam rise 166 which effected movement of the pistons 36 of the piston mount 32 through an intake stroke. Simultaneously, the cam roller 42 has just completed traversing a cam rise or valley 168 which effected a lowering of the pistons of the piston mount 34 for discharging the chunks of comminuted material 22, as illustrated. A similar cam fall 168 is located at the opposite extremity of the cam track 44 for the purpose of effecting discharge of comminuted material from the cylinder set 26 associated with the piston mount 32.

The sharp or abrupt downward movement of the pistons 36, in the position thereof illustrated in FIG. 10, is effected by a pair of abrupt cam rises 170, FIG. 3, depending from the upper margin of the central openings of the cam track 44. Each cam rise 170 very sharply engages the roller 40 or 42, as the case may be, and substantially instantaneously effects a sudden downward movement of the associated pistons 36, after which the cam roller just as abruptly engages an end wall of the cam fall 168 to rapidly and sharply raise the associated pistons to produce the desired inertial effect.

Thus, the cylinder set 26 first comes into registry with the inlet opening 20 to receive comminuted material under pressure, while simultaneously the cylinder set 28 is discharging comminuted material into the discharge opening 18. As the top plate 24 proceeds to the left, as viewed in FIG. 3, the cylinder set 26 discharges comminuted material through the discharge opening 16, while simultaneously the cylinder set 28 receives comminuted material through the inlet opening 20. This alternate registry of the cylinder sets 26 and 28 with the inlet opening 20 and the discharge openings 16 and 18 substantially increases the productive capacity of the apparatus 10, and more efficiently utilizes the available energy of the electric motor 134.

From the above it is seen that a method and apparatus has been provided for manufacturing substantially uniformly sized chunks or balls of comminuted material, and in a manner which greatly reduces the degree of adhesion between the comminuted material and the discharge pistons, whereby the comminuted material is prevented from sticking and clogging the apparatus 10.

Various modifications and changes may be made with regard to the foregoing detailed description without departing from the spirit of the invention or the scope of the following claims.

We claim:
1. Molding apparatus for comminuted material, said apparatus comprising:
   frame and receiving means including a pair of discharge openings and an intermediate inlet opening;
   a top plate longitudinally reciprocable over said frame and receiving means and including spaced sets of material-receiving openings;
   a pair of piston mounts superjacent said top plate and mounting sets of pistons complemental with said spaced sets of receiving openings, said mounts being vertically reciprocable upon said top plate;

drive means for longitudinally reciprocating said top plate;

and cam means mounted to said frame and receiving means and engageable by said pair of piston mounts during longitudinal reciprocation thereof with said top plate to alternately raise and lower said pair of piston mounts as the same come into registry with said inlet and discharge openings whereby comminuted material is drawn into said receiving openings adjacent said inlet opening and discharged from said receiving openings adjacent one of said discharge openings.

2. Molding apparatus for comminuted material, said apparatus comprising:

frame and receiving means including a pair of discharge openings and an intermediate inlet opening;

a top plate longitudinally reciprocable over said frame and receiving means and including spaced sets of material-receiving openings;

a pair of piston mounts superjacent said top plate and mounting sets of pistons complemental with said spaced sets of receiving openings, said mounts being vertically reciprocable upon said top plate;

drive means for longitudinally reciprocating said top plate;

and cam means mounted to said frame and receiving means and engageable by said pair of piston mounts during longitudinal reciprocation thereof with said top plate to alternately raise said sets of pistons as the same come into registry with said inlet opening to thereby draw comminuted material into said receiving openings, to alternately lower said sets of pistons as the same come into registry with said discharge openings, to thereby discharge comminuted material from said receiving openings, and to alternately abruptly raise said sets of pistons after the same have reached their farthest discharge positions to thereby effect separation of said comminuted material from said sets of pistons.

3. Molding apparatus for comminuted material, said apparatus comprising:

frame and receiving means including a pair of discharge openings and an intermediate inlet opening;

a top plate longitudinally reciprocable over said frame and receiving means and including spaced sets of material-receiving openings;

a pair of piston mounts superjacent said top plate and mounting sets of pistons complemental with said spaced sets of receiving openings, said mounts being vertically reciprocable upon said top plate;

drive means for longitudinally reciprocating said top plate;

cam means mounted to said frame and receiving means and engageable by said pair of piston mounts during longitudinal reciprocation thereof with said top plate to alternately raise said sets of pistons as the same come into registry with said inlet opening to thereby draw comminuted material into said receiving openings, to alternately lower said sets of pistons as the same come into registry with said discharge openings, to thereby discharge comminuted material from said receiving openings, and to alternately abruptly raise said sets of pistons after the same have reached their farthest discharge positions to thereby effect separation of said comminuted material from said sets of pistons;

and means for directing heated fluid against the discharge sides of said pistons in said farthest discharge positions to thereby facilitate separation of said comminuted material from said pistons.

4. Molding apparatus for comminuted material said apparatus comprising:

frame and receiving means including a pair of discharge openings and an intermediate inlet opening;

a top plate longitudinally reciprocable over said frame and receiving means and including spaced sets of material receiving openings;

a pair of piston mounts superjacent said top plate and mounting sets of pistons complemental with said spaced sets of receiving openings, said mounts being vertically reciprocable upon said top plate;

a pair of cam roller means secured to said pair of piston mounts, respectively;

drive means for longitudinally reciprocating said top plate;

and a cam track mounted to said frame and receiving means and engageable by said pair of cam roller means during longitudinal reciprocation thereof with said top plate to alternately raise and lower said pair of piston mounts as the same come into registry with said inlet and discharge openings whereby comminuted material is drawn into said receiving openings adjacent said inlet opening and discharged from said receiving openings adjacent one of said discharge openings.

5. Molding apparatus for comminuted material, said apparatus comprising:

frame and receiving means including a pair of discharge openings and an intermediate inlet opening;

a top plate longitudinally reciprocable over said frame and receiving means and including spaced sets of material-receiving openings;

a pair of piston mounts superjacent said top plate and mounting sets of pistons complemental with said spaced sets of receiving openings, said mounts being vertically reciprocable upon said top plate;

a pair of cam roller means secured to said pair of piston mounts, respectively;

drive means for longitudinally reciprocating said top plate;

and a cam track mounted to said frame and receiving means and engageable by said pair of cam roller means during longitudinal reciprocation thereof with said top plate to alternately raise and lower said pair of piston mounts as the same come into registry with said inlet and discharge openings whereby comminuted material is drawn into said receiving openings adjacent said inlet opening and discharged from said receiving openings adjacent one of said discharge openings, said cam track including abrupt cam rises engaged by said pair of cam roller means to suddenly alternately raise said pair of piston mounts after the pistons thereof have reached their farthest discharge positions to thereby effect separation of said comminuted material from said pistons.

6. Molding apparatus for comminuted material, said apparatus comprising:

frame and receiving means including a pair of discharge openings and an intermediate inlet opening;

a top plate longitudinally reciprocable over said frame and receiving means and including spaced sets of material-receiving openings;

a pair of piston mounts superjacent said top plate and mounting sets of pistons complemental with said spaced sets of receiving openings, said mounts being vertically reciprocable upon said top plate;

drive means for longitudinally reciprocating said top plate;

and cam means mounted to said frame and receiving means and engageable by said pair of piston mounts during longitudinal reciprocation thereof with said top plate to alternately raise said sets of pistons as the same come into registry with said inlet opening to thereby draw comminuted material into said receiving openings, to alternately lower said sets of pistons as the same come into registry with said discharge openings, to thereby locate the piston faces thereof below said top late to discharge comminuted material from said receiving openings, and including abrupt cam rises to suddenly alternately raise said pair of piston mounts after said piston faces are below said top plate to thereby utilize the inertia of said comminuted material to effect separation thereof from said piston faces.

7. Molding apparatus for comminuted material, said apparatus comprising:

frame and receiving means including a pair of discharge openings and an intermediate inlet opening;

a top plate longitudinally reciprocable over said frame and receiving means and including spaced sets of material-receiving openings;

a pair of piston mounts superjacent said top plate and mounting sets of pistons complemental with said spaced sets of receiving openings, said mounts being vertically reciprocable upon said top plate;

drive means for longitudinally reciprocating said top plate;

cam means mounted to said frame and receiving means and engageable by said pair of piston mounts during longitudinal reciprocation thereof with said top plate to alternately raise said sets of pistons as the same come into registry with said inlet opening to thereby draw comminuted material into said receiving openings, to alternately lower said sets of pistons as the same come into registry with said discharge openings, to thereby locate the piston faces thereof below said top plate to discharge comminuted material from said receiving openings, and including abrupt cam rises to suddenly alternately raise said pair of piston mounts after said piston faces are below said top plate to thereby utilize the inertia of said comminuted material to effect separation thereof from said piston faces;

and means for directing steam adjacent said piston faces to facilitate said separation of comminuted material therefrom.

8. Molding apparatus for comminuted material, said apparatus comprising:

frame and receiving means including an inlet opening and a discharge opening;

a plate including a plurality of material receiving openings, and reciprocable across said frame and receiving means to bring said material receiving openings into successive registry with said inlet opening and said discharge opening;

a piston mount adjacent said plate;

a plurality of pistons carried by said piston mount for vertical reciprocation in said material receiving openings at all times whereby said pistons and said piston mount are movable in common with said plate, and said pistons are always aligned with said material receiving openings;

drive means for moving said plate;

and means operatively engageable with said piston mount during movement thereof with said plate to alternately raise and lower said piston mount upon registry of all of said material receiving openings with said inlet and discharge openings, respectively, whereby comminuted material is simultaneously drawn into all of said material receiving openings upon registry thereof with said inlet openings, and simultaneously discharged from all of said material receiving openings upon registry thereof with said discharge opening.

References Cited by the Examiner

UNITED STATES PATENTS

| | | | |
|---|---|---|---|
| 798,361 | 8/1905 | Morton. | |
| 994,714 | 6/1911 | Boyle | 17—32 |
| 2,708,287 | 5/1955 | Long et al. | 17—32 |
| 2,814,921 | 12/1957 | Beerend | 17—32 X |
| 3,122,869 | 3/1964 | Miller et al. | 17—32 X |
| 3,177,524 | 4/1965 | Gause | 17—32 |
| 3,203,037 | 8/1965 | Anhanger et al. | 17—32 |

SAMUEL KOREN, *Primary Examiner.*

LUCIE H. LAUDENSLAGER, *Examiner.*